United States Patent [19]

Fritsch

[11] 3,945,666

[45] Mar. 23, 1976

[54] POWERED OUTRIGGER BEAMS HAVING STABILIZING SPACER PAD MEANS

[75] Inventor: Robert A. Fritsch, Cedar Rapids, Iowa

[73] Assignee: Harnischfeger Corporation, Milwaukee, Wis.

[22] Filed: Mar. 17, 1975

[21] Appl. No.: 558,925

[52] U.S. Cl. ................ 280/150.5; 212/145; 308/3 R

[51] Int. Cl.$^2$ ............................................ B60S 9/00

[58] Field of Search ............. 308/2 R, 3 R, 3.9, 3 B, 308/3 C, 175; 214/730, 672, 139, 1 BV, 1 BH; 212/8 R, 145; 280/150.5; 296/28 C; 108/129–132; 248/164, 421, 432, 439, 188.6; 254/122, 126

[56] References Cited

UNITED STATES PATENTS

| | | | |
|---|---|---|---|
| 433,112 | 7/1890 | Williams | 308/175 |
| 2,310,284 | 2/1943 | Gurries | 214/139 |
| 2,393,299 | 1/1946 | Denning | 214/139 |
| 3,144,786 | 8/1964 | Dale | 308/175 |
| 3,279,622 | 10/1966 | Person | 212/145 |

*Primary Examiner*—Robert J. Spar
*Assistant Examiner*—Lawrence J. Oresky
*Attorney, Agent, or Firm*—James E. Nilles

[57] ABSTRACT

Hydraulically powered outrigger beams for cranes including a positive safety locking system for securing the outrigger beams in a fixed downward position to provide stabilization of the vehicle and crane during operation of the crane.

4 Claims, 12 Drawing Figures

POWERED OUTRIGGER BEAMS HAVING STABILIZING SPACER PAD MEANS

BACKGROUND OF THE INVENTION

This invention generally pertains to hydraulically powered and extensible outrigger beams for mobile cranes and is an improvement over the outrigger assembly shown in U.S. Pat. No. 3,073,458 issued Jan. 15, 1963 to Wieschel, and assigned to an assignee common with this application.

SUMMARY OF THE INVENTION

The present invention provides a wheel supported vehicle having outrigger stabilizer beams arranged in criss-cross fashion under the vehicle and having improved positive safety locking means for securing each of the outrigger beams from inadvertent collapse if the hydraulic motor forcing the beams downwardly fails. The vehicle has spacing pad members between the movable pairs of outrigger beams to maintain accurate clearances and sliding surfaces between the beams and to stabilize the vehicle when supported by the outrigger beams. The spacing members are mounted on the vehicle frame and on the outrigger beams in such positions so as to maintain such surface contact so as to properly space the outrigger beams regardless of the vertical position of the beams.

The spacing pad members act to eliminate the fore and aft movement of the beams, which movement would be transmitted to the vertical hydraulic outrigger motor and their mounting pins which are not designed to accept such fore and aft forces.

DESCRIPTION OF A PREFERRED EMBODIMENT

The present invention generally relates to supported vehicles, such as for example, mobile cranes, having hydraulically powered telescoping outrigger beams for stabilizing the vehicle during operation of the crane and having means to positively lock the telescoping outrigger beams in their downward position to preclude inadvertent collapse of the outrigger structure.

Figure 1:
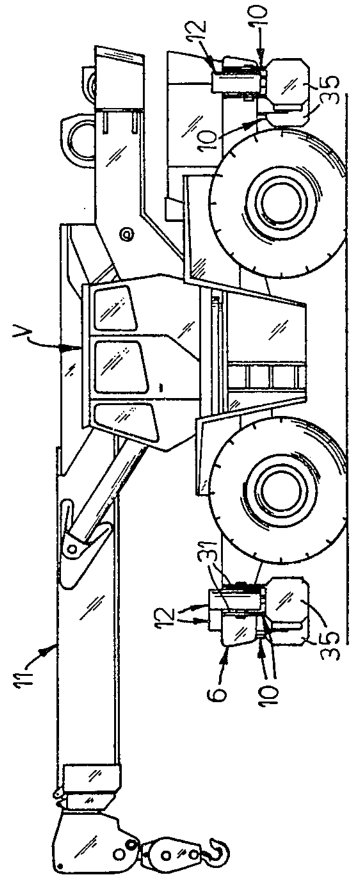
FIG. 1 is a side elevation of a vehicle mounted crane including powered outrigger beams attached to each end of the vehicle frame.
Figure 2:
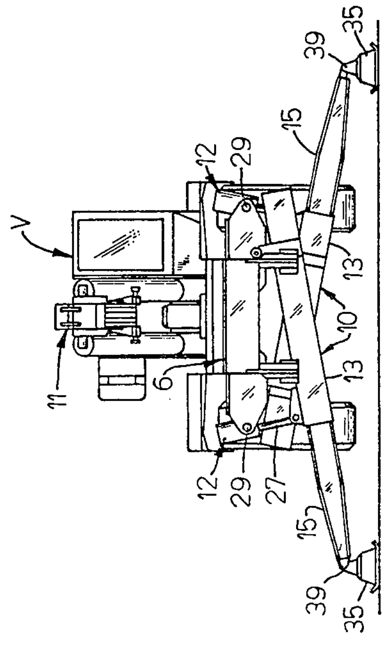
FIG. 2 is an end view of the vehicle shown in FIG. 1 and further showing the powered outrigger beams in a deployed position.
Figure 3:
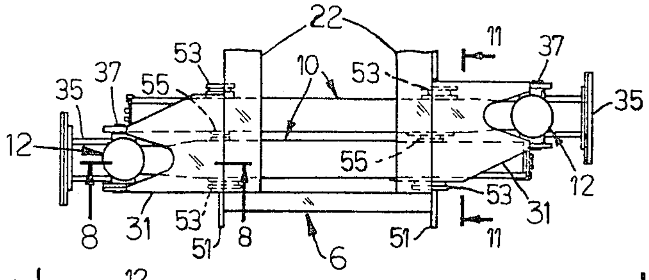
FIG. 3 is a partial top view of one pair of the powered outrigger beams taken along the line 3—3 in FIG. 4.

A typical vehicle is provided with outrigger beams 10 to stabilize the vehicle during operation of the boom 11 which is mounted upon the vehicle. The vehicle is provided at each end with a pair of oppositely extending outrigger beams 10 which are pivotally secured to the frame 6 and which can be deployed to assume the position shown in FIG. 2. The pairs of outrigger beams 10 at each end of the vehicle frame 6 are substantially identical and each of the outrigger beams 10 is attached to the frame so it extends across the bottom of the frame and is pivotally connected at one end to the side of the frame opposite its direction of extension. When deployed in their downward position, the beams assume a criss-cross configuration.

Figure 4:
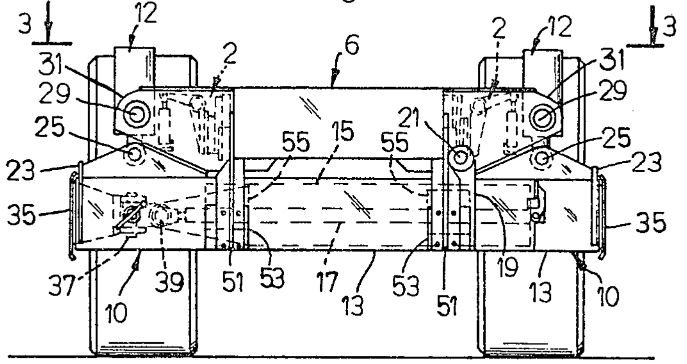
FIG. 4 is an elevation view of a pair of the powered outrigger beams shown in a retracted position.
Figure 5:
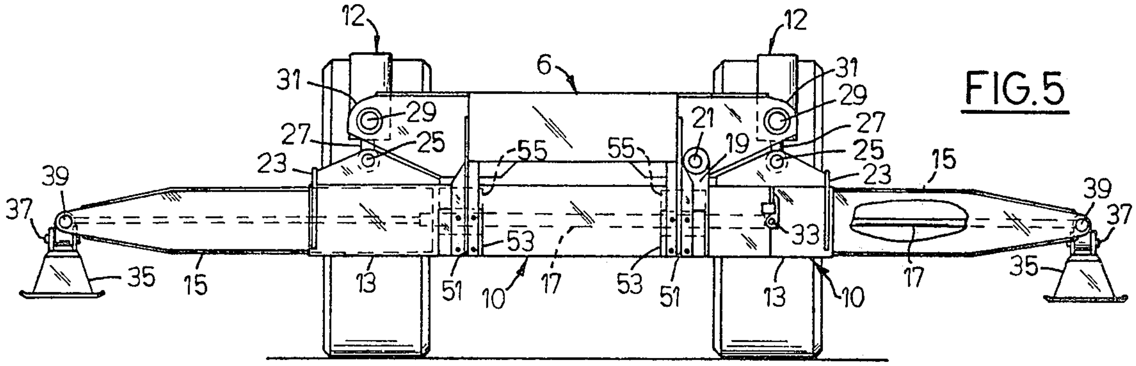
FIG. 5 is a view similar to that of FIG. 4 and showing the outrigger beams in an extended position.
Figure 6:
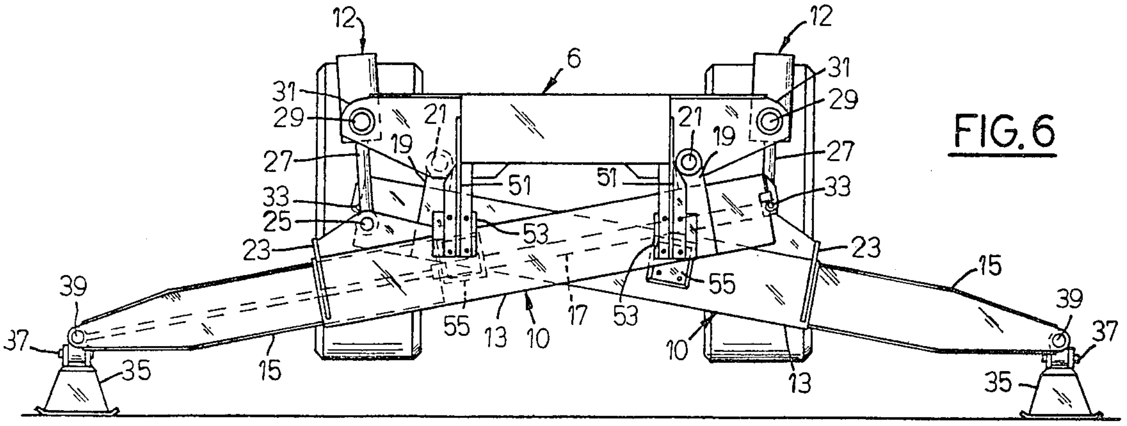
FIG. 6 is a view similar to that of FIGS. 4 and 5 showing the outrigger beams in a fully deployed position.

Each of the outrigger beams consists of a relatively fixed outer beam section 13 and a telescopically related inner beam section 15 which is selectively extendible and retractable within the outer beam section. Both of these beam sections have a rectangular cross sectional configuration, as shown in FIGS. 3–6, for maximum strength and to provide a housing for a hydraulic motor 17 (FIGS. 4–6). Each of the respective outrigger beam sections is pivotally mounted to the vehicle frame for limited oscillation in a vertical direction. Each of the beams is attached at one end to the frame by a pivot bracket 19 extending downwardly from the frame and is swingable on a pivot pin 21. At its opposite end, the outer beam section 13 is embraced by a yoke 23 which is, in turn, pivotally connected on pin 25 to the piston rod 27 of hydraulic motor 12. The motor 12 is supported on trunnions 29 which are oscillatable between spaced extensions 31 which project laterally from the frame 6.

Telescopic movement is imparted to the inner beam section 15 by hydraulic motor 17 which is located within the hollow cross section of the beams 13 and 15 and which is pivotally connected at one end to the outer beam 13 by a pin 33. Both of the hydraulic motors are double-acting and actuated by conventional hydraulic fluid supplies and control mechanisms.

Each of the telescopic beam sections has at its end a ground engaging foot 35 which is pivotally attached on pivot pins 37 and 39 so as to swing downwardly as shown in FIG. 5 when the inner beam section 15 is extended and can be partially withdrawn into the outer beam section 13 as shown in FIG. 4.

Figure 11:
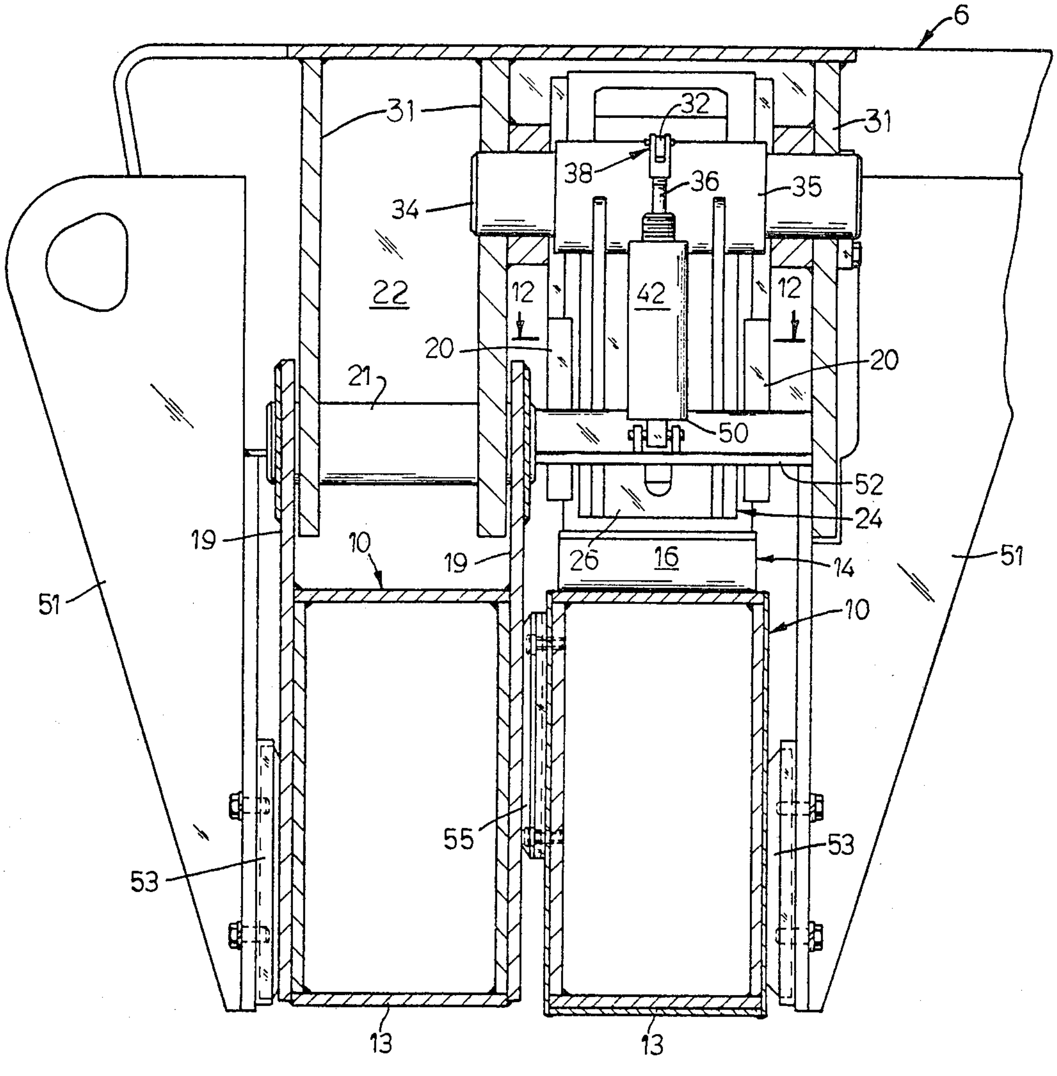
FIG. 11 is an enlarged cross section of a pair of powered outrigger beams taken along line 11—11 in FIG. 3.

Each pair of outrigger beams 10 includes a plurality of spacing pads 53 (FIG. 11) for maintaining the proper positioning of the outrigger beams with respect to each other and with respect to the vehicle frame. The spacing pads are designed to insure a tight fit between the outrigger beams and to prevent any movement of the vehicle or crane due to flexibility in the outrigger beams or their connection to the vehicle frame. The frame 6 has a plurality of downwardly extending support brackets 51 attached thereto, each supporting a spacing pad 53. The spacing pads 53 are made of such material as to be easily slideable with respect to the surface of the side of the outrigger beam when the beams are pivoted vertically. A spacing pad 55 is also attached to each of the outrigger beams at a point intermediate their length and on the surface of the beams opposing the other beams constituting the pair. As shown in FIG. 6, the spacing pads 53 and 55 are located such that even when the outrigger beams are in their downward position part of the surface area of the spacing pads is in contact with the opposing beam. The spacing pads thus maintain positioning of the outrigger beams and further prevent twisting of the vehicle while it is stabilized by the outrigger.

Figure 8:
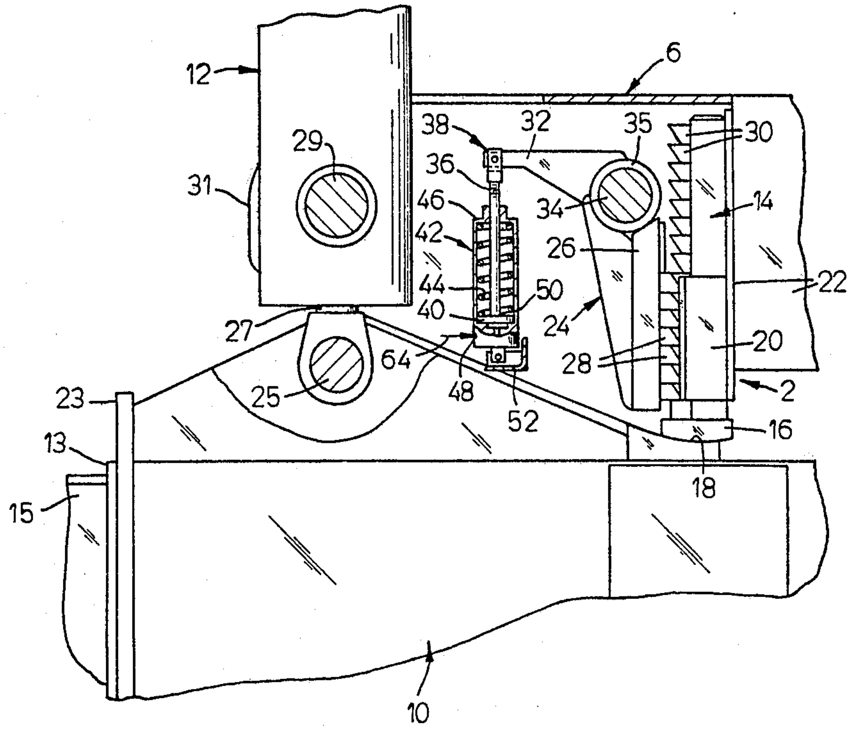
FIG. 8 is an enlarged detail view of the positive safety locking system taken along line 8—8 of FIG. 3.
Figure 9:
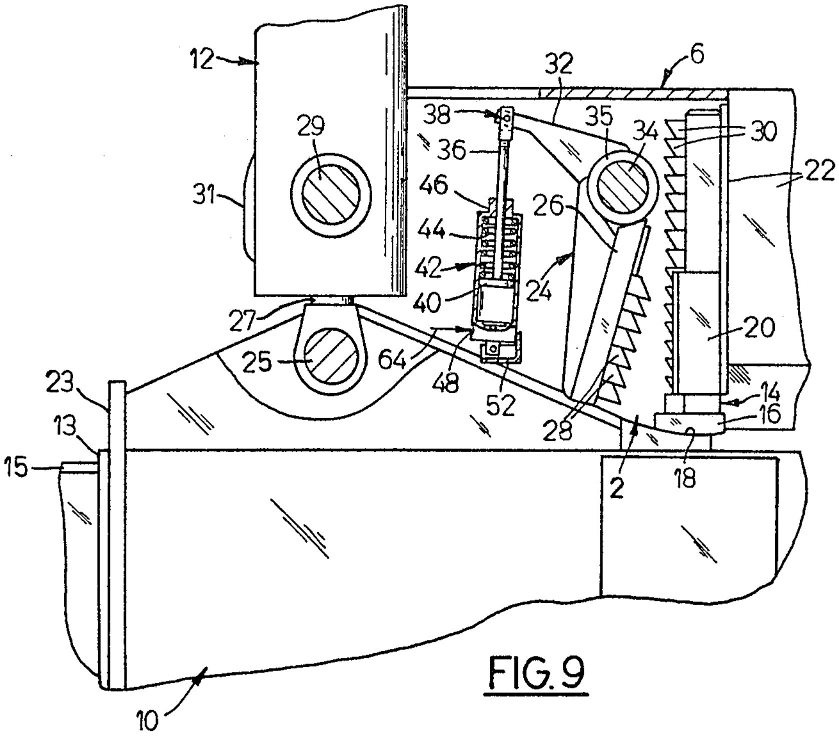
FIG. 9 is a view similar to FIG. 8 showing the positive safety locking system in a disengaged position.
Figure 10:
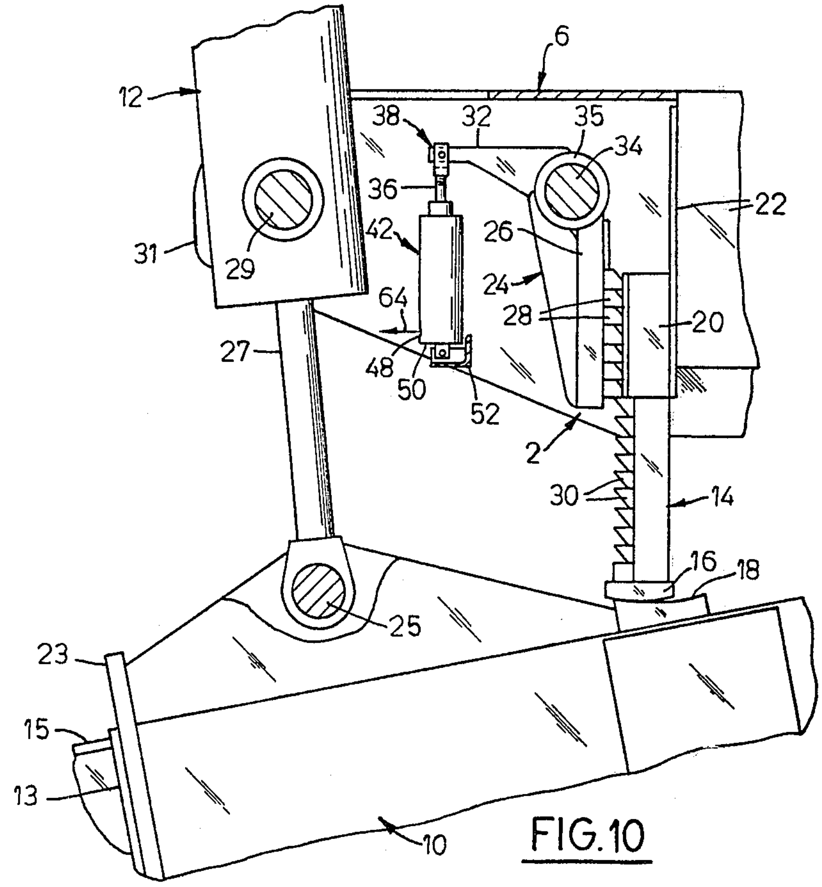
FIG. 10 is a view similar to FIG. 8 showing the positive safety locking system when the outrigger beams are in a deployed position.
Figure 12:
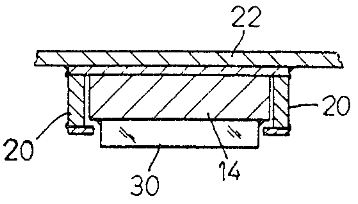
FIG. 12 is an enlarged cross section taken through line 12—12 in FIG. 11.

The safety locking apparatus includes a vertically operable ratchet means 2 which includes a vertically slideable ratchet rack 14 and a spring biased pivotable pawl 24 is shown in detail in FIGS. 8–10. FIG. 8 shows a partial cutaway view of vertically operable ratchet means 2 with the outrigger beam 10 in its upward position and the vertical outrigger cylinder assembly 12 in its retracted position. When the outrigger beam 10 is in this position, the ratchet rack 14 is in an upwardly biased position, as shown, with the ratchet rack foot 16 resting on the surface 18 of the outrigger beam. As shown in FIGS. 8 and 12, the ratchet rack 14 is slideably mounted in rack guide 20 so as to be movable only in the vertical direction, the rack guide 20 being rigidly secured to the frame extensions 22. Also attached to the frame extensions 22 is the pivotable pawl member 24. The pawl member 24 includes a downwardly extending vertical member 26 which supports a plurality of pawl teeth 28 which are designed to mesh with ratchet teeth 30 of ratchet rack 14. The pawl 24 also includes a horizontally extending vertical member 26, the pawl 24 is pivotally mounted to the frame extensions 22 by a pivot pin 34 extending through a bore 35 in the pawl at the juncture of the lever arm 32 and the vertical member 26. At its other end the pawl lever arm 32 is pivotally connected to a piston rod 36 by yoke pin assembly 38. The piston rod 36 is in turn connected to a piston head 40 which is received within the pneumatic cylinder 42. The pneumatic cylinder 42 is provided with a pawl biasing spring 44 which is located between the upper wall 46 of the pneumatic cylinder 42 and the piston head 40, the pawl biasing spring 44 functioning to cause said pawl lever arm 32 to apply a torque on the pawl about pivot pin 34 such that the pawl teeth 28 of the downwardly extending vertical member 26 are biased into intermeshing engagement with ratchet teeth 30. The pneumatic cylinder 42 is also supplied with a source of pneumatic pressure through port 48 such that pneumatic pressure may be forced between the lower wall 50 and the piston head 40. Such pneumatic pressure causes piston rod 36 to force the pawl 24 to rotate about pivot pin 34 and out of engagement with the ratchet rack 14 as shown in FIG. 9. As further shown, the pneumatic cylinder 42 is rigidly attached to the frame extensions 22 by cylinder mount 52.

Figure 7:
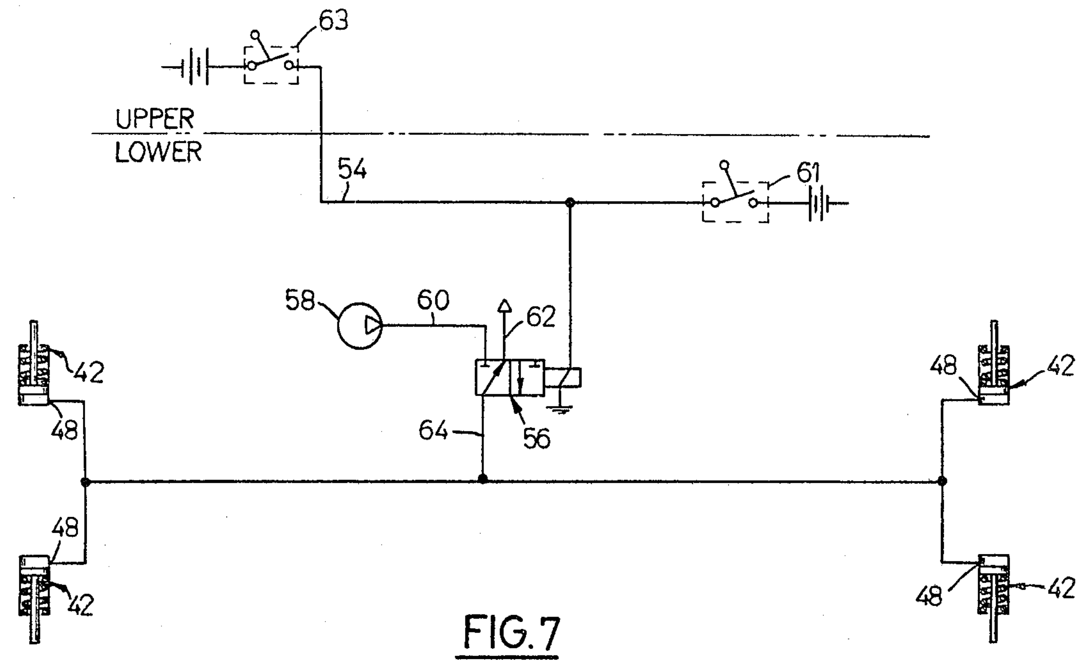
FIG. 7 is a schematic diagram of the pneumatic system used to activate the positive safety locking system of the present invention.

FIG. 7 shows the pneumatic circuit for delivering pneumatic pressure to each of the pneumatic cylinders 42 shown schematically in order to activate the locking assemblies. An electrical main switch 63 operated by the machine operator in the vehicle cab is connected by line 54 to a solenoid operated spring returned valve 56 mounted on the vehicle frame. The solenoid operated valve 56 is operable to control pneumatic pressure from pump 58 through line 60 to line 64 connected to the hydraulic cylinders 42 and to vent the cylinders 42 to an exhaust line 62. As is apparent from FIG. 7, the single switch 63 is operable to control all of the pneumatic cylinders 42 simultaneously. As also shown, an auxiliary switch 61 may be included in such a manner so as to allow the operator to control the safety locking system from the ground rather than from the cab of the vehicle.

OPERATION

When the outrigger beam 10 is forced downwardly by the vertical outrigger cylinder assembly 12 and caused to pivot about pivot pin 21, the outrigger beam 10 moves downwardly away from the ratchet rack foot 16. Pneumatic pressure may be applied to the pneumatic cylinder 42 to cause the force of spring 44 to be overcome and pawl 24 to be rotated out of engagement with the ratchet rack 14 as shown in FIG. 9, thereby allowing the ratchet rack 14 to slide downwardly in rack guide 20 as shown in FIG. 10.

Once the outrigger beam 10 is in a position to stabilize the crane and the ratchet rack 14 slides downwardly due to its own weight such that ratchet rack foot 16 is in contact with the surface 18, the pneumatic pressure in cylinder 42 may be released and the pawl biasing spring 44 will cause said pawl teeth 28 to securely mesh with the ratchet teeth 30. As can be seen in FIG. 10, such intermeshing of the teeth 28 and 30 will prevent upward movement of the ratchet rack 14. In the event the fluid pressure in vertical outrigger cylinder assembly 12 is released, the weight of the vehicle will cause the frame 22 to place downward force on the ratchet rack teeth 30 through pawl pivot pin 34, downwardly extending vertical member 36, and pawl teeth 28 attached thereto. The forces acting between pawl teeth 28 and ratchet teeth 30, as seen in FIG. 10, create a counter-clockwise torque on pawl 24 about pawl pivot pin 34 thereby insuring meshing of the respective teeth 28 and 30. It should also be noted that the shape of the pawl teeth 28 and ratchet teeth 30 is such that, regardless of the vertical position of the outrigger beam, the teeth will engage each other in such a manner, that, when hydraulic pressure in cylinder 12 is released, the teeth will slide together into a locked position as shown in FIG. 10.

In order to raise outrigger beam 10 to return it to an inoperative or storage position, it is necessary to first activate hydraulic cylinder 12 to release the load on the ratchet rack and pawl and then to provide pneumatic pressure through line 48 to pneumatic cylinder 42 to create an upward force on piston head 40. Such upward force on the piston head 40 causes piston rod 36 to result in a clockwise torque, as seen in FIG. 9, on pawl lever arm 32 and integrally connected downwardly extending vertical member 26. This causes separation of the pawl teeth 28 and ratchet teeth 30. The vertical outrigger cylinder assembly 12 may then pull outrigger beam 10 upwardly causing said ratchet rack 14 to slide upwardly in rack guide 20.

RESUME

The spacing pad means connected between the frame and each of the beams and also connected between the two beams, provides a firm sliding fit between the beams and also between the frame, regardless of the vertical movement of the beams or their vertical position relative to the frame. At all times, a stabilized pair of criss-cross outrigger beams is provided.

I claim:

1. Extensible outrigger beam apparatus for a wheel supported vehicle having a frame, said apparatus comprising a pair of hydraulically extensible stabilizer outrigger beams for spanning laterally underneath the frame in criss-cross fashion, each beam having a pivotal connection at one end to one side of the frame, said beams extending laterally beyond the other side of said frame from which they are pivotally connected, a motor for controllably pivoting each of said beams about its pivotal connection to the frame whereby the vertical position of the beam with respect to the frame is readily adjusted, means connected between said frame and each of said beams for locking each beam in a fixed position about its pivotal connection to prevent said beams from upward pivotal movement, and spacing pad means connected between said frame and said beams and also connected between said beams providing a firm sliding fit between said beams and said frame.

2. The apparatus set forth in claim 1 wherein at least one of said spacing pad means is located between said beams and secured to one of said beams.

3. The apparatus set forth in claim 1 wherein at least one of said spacing pads connected between said frame and said beams is rigidly secured to said frame.

4. The apparatus of claim 1 wherein said frame includes at least one downwardly extending projection for supporting one of said spacing pads.

* * * * *